(12) United States Patent  
Weder

(10) Patent No.: US 6,494,020 B2
(45) Date of Patent: Dec. 17, 2002

(54) STICKY ELEMENT UPON WHICH INSECTS ADHERE AND MATERIALS AND METHODS

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

(21) Appl. No.: 10/128,789

(22) Filed: Apr. 22, 2002

(65) Prior Publication Data

US 2002/0116899 A1 Aug. 29, 2002

Related U.S. Application Data

(63) Continuation of application No. 09/826,154, filed on Apr. 4, 2001, now Pat. No. 6,418,699, which is a continuation of application No. 09/434,212, filed on Nov. 4, 1999, now abandoned, which is a continuation of application No. 09/009,994, filed on Jan. 21, 1998, now Pat. No. 6,003,285, which is a continuation of application No. 08/586,043, filed on Jan. 16, 1996, now Pat. No. 5,713,183, which is a continuation of application No. 08/282,858, filed on Jul. 29, 1994, now Pat. No. 5,517,802, which is a continuation of application No. 07/895,954, filed on Jun. 9, 1992, now abandoned, which is a continuation-in-part of application No. 07/707,417, filed on May 28, 1991, now abandoned.

(51) Int. Cl.⁷ .............................................. B65B 11/02
(52) U.S. Cl. .............................. 53/397; 53/399; 53/410; 53/465
(58) Field of Search ........................ 53/397, 399, 410, 53/465; 493/386, 114, 908; 47/26, 72

(56) References Cited

U.S. PATENT DOCUMENTS

| | | |
|---|---|---|
| 732,889 A | 7/1903 | Paver |
| 1,525,015 A | 2/1925 | Weeks |
| 2,371,985 A | 3/1945 | Freiberg .................... 206/46 |
| 2,529,060 A | 11/1950 | Trillich ..................... 117/68.5 |
| 2,846,060 A | 8/1958 | Yount ........................ 206/58 |
| 2,883,262 A | 4/1959 | Borin ........................ 21/56 |
| 3,022,605 A | 2/1962 | Reynolds .................... 47/58 |
| 3,121,647 A | 2/1964 | Harris et al. ............... 118/202 |
| 3,130,113 A | 4/1964 | Silman ...................... 161/97 |
| 3,271,922 A | 9/1966 | Wallerstein et al. .......... 53/3 |
| 3,508,372 A | 4/1970 | Wallerstein et al. .......... 53/3 |
| 4,380,564 A | 4/1983 | Cancio et al. ............... 428/167 |
| 4,733,521 A | 3/1988 | Weder et al. ................ 53/580 |
| 4,773,182 A | 9/1988 | Weder et al. ................ 47/72 |
| 4,897,031 A | 1/1990 | Weder et al. ................ 425/388 |
| 4,989,396 A | 2/1991 | Weder et al. ................ 53/397 |
| 5,111,638 A | 5/1992 | Weder ....................... 53/397 |
| 5,244,093 A | 9/1993 | Weder ....................... 53/397 |
| 5,245,814 A | 9/1993 | Weder ....................... 53/397 |
| 5,307,606 A | 5/1994 | Weder ....................... 53/410 |
| 5,361,482 A | 11/1994 | Weder ....................... 53/397 |
| 5,369,934 A | 12/1994 | Weder ....................... 53/397 |
| 5,388,386 A | 2/1995 | Weder ....................... 53/397 |
| 5,428,939 A | 7/1995 | Weder et al. |
| 5,450,707 A | 9/1995 | Weder et al. |

(List continued on next page.)

Primary Examiner—John Sipos
(74) Attorney, Agent, or Firm—Dunlap, Codding & Rogers, P.C.

(57) ABSTRACT

A sticky element, comprising a sticky element having an insect-attracting color and an insect-attracting scent, the sticky element comprising sufficient sticky qualities to cause an insect to become permanently attached to the sticky element when any portion of the insect contacts with the sticky element, the sticky element adaptable to being disposed upon a surface. The surface may comprise a wrapping material, a flower pot cover, a flower pot, a floral arrangement, or other surface. When the sticky element is disposed on a wrapping material, the wrapping material is used to wrap a floral arrangement or decoratively cover a flower pot.

13 Claims, 4 Drawing Sheets

U.S. PATENT DOCUMENTS

| | | | |
|---|---|---|---|
| 5,459,976 A | 10/1995 | Weder et al. | |
| 5,467,573 A | 11/1995 | Weder et al. | |
| 5,479,758 A | 1/1996 | Weder | 53/410 |
| 5,481,850 A | 1/1996 | Weder et al. | |
| 5,509,188 A | 4/1996 | Weder | 53/397 |
| 5,509,251 A | 4/1996 | Weder et al. | |
| 5,517,802 A | 5/1996 | Weder | 53/411 X |
| 5,544,469 A | 8/1996 | Weder et al. | 53/410 |
| 5,551,140 A | 9/1996 | Weder | 53/397 |
| 5,560,181 A | 10/1996 | Weder | 53/410 |
| 5,560,488 A | 10/1996 | Weder | 53/449 X |
| 5,566,439 A | 10/1996 | Weder | 53/410 X |
| 5,572,849 A | 11/1996 | Weder | 53/397 |
| 5,575,133 A | 11/1996 | Weder | 53/397 |
| 5,584,162 A | 12/1996 | Weder | 53/399 |
| 5,589,425 A | 12/1996 | Craig et al. | |
| 5,595,045 A | 1/1997 | Weder et al. | |
| 5,595,048 A | 1/1997 | Weder et al. | |
| 5,605,028 A | 2/1997 | Craig et al. | |
| 5,609,009 A | 3/1997 | Weder | 53/399 |
| 5,615,533 A | 4/1997 | Weder | 53/410 |
| 5,615,534 A | 4/1997 | Weder | 53/410 |
| 5,617,708 A | 4/1997 | Weder | 53/465 |
| 5,617,709 A | 4/1997 | Weder | 53/465 |
| 5,625,937 A | 5/1997 | Weder | 29/469.5 |
| 5,626,003 A | 5/1997 | Weder | 53/412 |
| 5,628,164 A | 5/1997 | Weder | 53/397 |
| 5,634,320 A | 6/1997 | Weder | 53/412 |
| 5,636,502 A | 6/1997 | Weder et al. | |
| 5,640,829 A | 6/1997 | Weder et al. | |
| 5,647,188 A | 7/1997 | Weder et al. | |
| 5,647,193 A | 7/1997 | Weder | 53/465 |
| 5,651,233 A | 7/1997 | Weder et al. | |
| 5,655,353 A | 8/1997 | Weder et al. | |
| 5,661,950 A | 9/1997 | Weder | 53/397 |
| 5,661,952 A | 9/1997 | Weder et al. | |
| 5,664,403 A | 9/1997 | Weder et al. | |
| 5,664,675 A | 9/1997 | Weder | 53/397 |
| 5,680,740 A | 10/1997 | Weder | |
| 5,682,720 A | 11/1997 | Weder et al. | |
| 5,682,721 A | 11/1997 | Weder et al. | |
| 5,682,722 A | 11/1997 | Weder et al. | |
| 5,682,725 A | 11/1997 | Weder | 53/412 |
| 5,687,469 A | 11/1997 | Weder | 29/469.5 |
| 5,687,546 A | 11/1997 | Weder et al. | |
| 5,689,939 A | 11/1997 | Weder | 53/464 |
| 5,699,648 A | 12/1997 | Weder | 53/410 |
| 5,699,652 A | 12/1997 | Craig et al. | |
| 5,704,108 A | 1/1998 | Weder | 29/469.5 |
| 5,704,109 A | 1/1998 | Weder | 29/469.5 |
| 5,706,628 A | 1/1998 | Craig et al. | |
| 5,713,183 A | 2/1998 | Weder | |
| 5,713,184 A | 2/1998 | Weder | |
| 5,715,588 A | 2/1998 | Weder | 29/469.5 |
| 5,715,649 A | 2/1998 | Weder | 53/397 |
| 5,715,650 A | 2/1998 | Weder | 53/397 |
| 5,720,150 A | 2/1998 | Weder | 53/397 |
| 5,727,361 A | 3/1998 | Weder | 53/397 |
| 5,740,655 A | 4/1998 | Weder | 53/397 |
| 5,740,656 A | 4/1998 | Weder | 53/399 |
| 5,740,664 A | 4/1998 | Weder et al. | |
| 5,761,880 A | 6/1998 | Weder | 53/412 |
| 5,778,636 A | 7/1998 | Weder | |
| 5,781,981 A | 7/1998 | Weder | 29/450 |
| 5,782,062 A | 7/1998 | Weder | 53/465 |
| 5,784,859 A | 7/1998 | Weder | 53/397 |
| 5,794,405 A | 8/1998 | Weder | |
| 5,802,809 A | 9/1998 | Weder | |
| 5,809,629 A | 9/1998 | Weder | 29/469.5 |
| 5,813,198 A | 9/1998 | Weder | 53/465 |
| 5,815,905 A | 10/1998 | Weder | 29/469.5 |
| 5,816,020 A | 10/1998 | Weder | 53/397 |
| 5,816,022 A | 10/1998 | Weder | 53/397 |
| 5,832,695 A | 11/1998 | Weder et al. | |
| 5,836,447 A | 11/1998 | Weder | 206/423 |
| 5,839,256 A | 11/1998 | Weder et al. | |
| 5,842,323 A | 12/1998 | Weder | 53/397 |
| 5,890,592 A | 4/1999 | Weder et al. | |
| 5,913,799 A | 6/1999 | Weder et al. | |
| 5,950,357 A | 9/1999 | Weder et al. | |
| 5,974,767 A | 11/1999 | Weder | |
| 6,003,285 A | 12/1999 | Weder | |
| 6,006,500 A | 12/1999 | Craig et al. | |
| 6,023,912 A | 5/2000 | Weder | |
| 6,058,677 A | 5/2000 | Weder | |
| 6,080,453 A | 6/2000 | Weder et al. | |

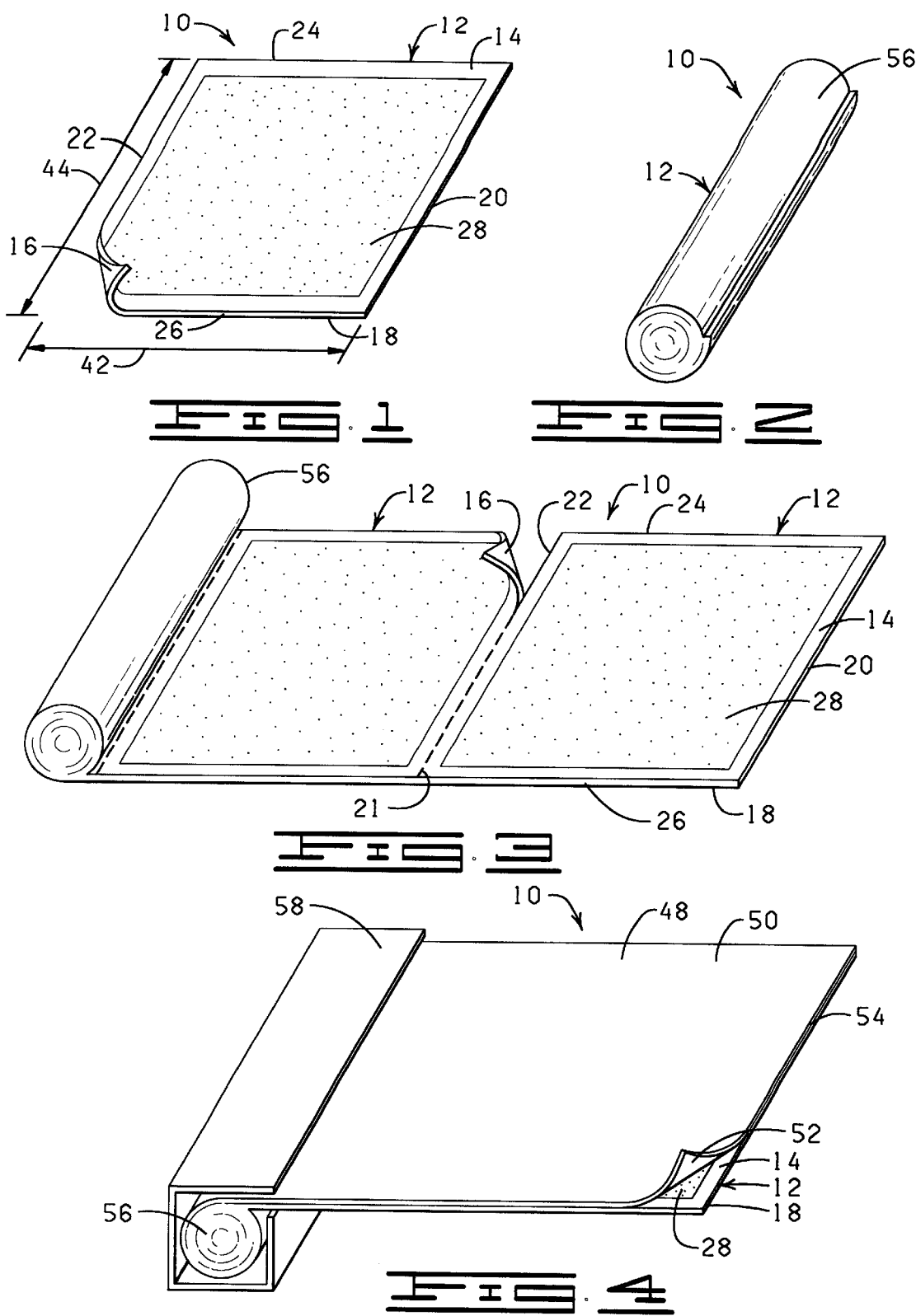

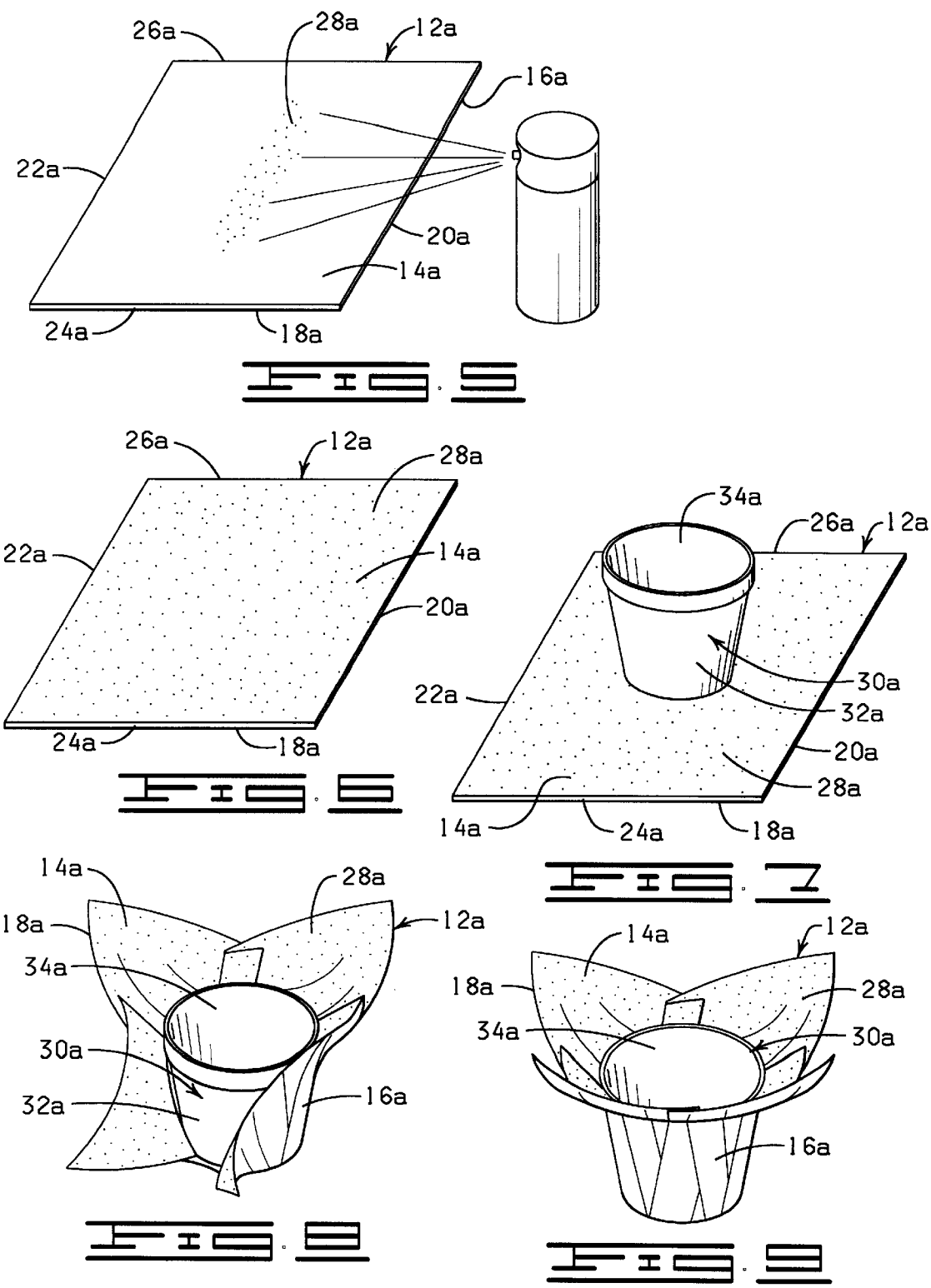

STICKY ELEMENT UPON WHICH INSECTS ADHERE AND MATERIALS AND METHODS

CROSS-REFERENCE TO RELATED APPLICATIONS

This application is a continuation of U.S. Ser. No. 09/826,154, filed Apr. 4, 2001 now U.S. Pat. No. 6,418,699 patented Jul. 16, 2002; which is a continuation of U.S. Ser. No. 09/434,212, filed Nov. 4, 1999, now abandoned; which is a continuation of U.S. Ser. No. 09/009,994, filed Jan. 21, 1998, now U.S. Pat. No. 6,003,285, patented Dec. 21, 1999; which is a continuation of U.S. Ser. No. 08/586,043, filed Jan. 16, 1996, now U.S. Pat. No. 5,713,183, patented Feb. 3, 1998; which is a continuation of U.S. Ser. No. 08/282,858, filed Jul. 29, 1994, now U.S. Pat. No. 5,517,802, filed May 21, 1996; which is a continuation of U.S. Ser. No. 07/895,954, filed Jun. 9, 1992, now abandoned; which is a continuation in part of U.S. Ser. No. 07/707,417, filed May 28, 1991, now abandoned.

FIELD OF THE INVENTION

This invention relates to sticky elements upon which insects adhere, and particularly, surfaces and materials having a sticky element upon which insect adhere, and methods of using same.

BRIEF DESCRIPTION OF THE DRAWINGS

FIG. 1 is a perspective view of the sheet of material of the present invention, showing the upper surface, the sticky element design being disposed thereon.

FIG. 2 is a perspective view of a plurality of sheets of material constructed in accordance with the present invention forming a continuous roll of material.

FIG. 3 is a perspective view of a plurality of sheets of material constructed in accordance with the present invention forming a continuous roll, showing one sheet of material partially detached.

FIG. 4 is a perspective view of a plurality of sheets of material constructed in accordance with the present invention forming a continuous roll of material disposed in a dispenser, showing one sheet of material partially detached.

FIG. 5 is a perspective view of another embodiment of the sheet of material of the present invention, showing the upper surface, the sticky element being disposed upon the upper surface.

FIG. 6 is a perspective view of another embodiment of the sheet of material of the present invention, showing the sticky element disposed on the upper surface of the sheet of material.

FIG. 7 is a perspective view of the sheet of material of the present invention, showing the method of disposing a flower pot on the sheet of material.

FIG. 8 is a perspective view of the sheet of material of the present invention, showing the method of wrapping the sheet of material about a flower pot.

FIG. 9 is a perspective view of the sheet of material of the present invention wrapped about a flower pot.

DESCRIPTION OF THE PREFERRED EMBODIMENTS

Figure 10:
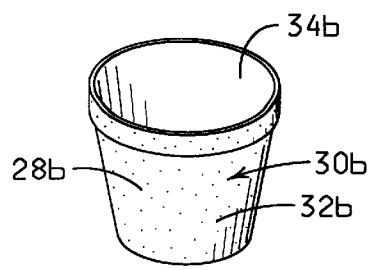
FIG. 10 is a perspective view of the flower pot utilized in the present invention, showing a sticky element disposed on the flower pot.

One drawback of sending fresh flowers, a floral arrangement (with or without a container), or a potted plant is the tendency for insects to be present upon the fresh flowers, floral arrangement, or potted plant. Not infrequently after one of the foregoing items has been received, insects crawl from it across the decorative wrapping material wrapped about the item, into the recipient's home, office, or hospital room. Obviously, this type of insect infestation is undesirable.

The present invention contemplates a sticky element, which is disposed upon a wrapping material for wrapping the above-defined items, including pre-formed flower pot covers, the sticky element having sufficient sticky properties to cause insects which contact the sticky element to become permanently attached thereto. Such a sticky element has an insect-attracting color and an insect-attracting scent. The sticky element may comprise an insecticide as well.

The wrapping material of the present invention has disposed upon at least one surface of the wrapping material the sticky element described herein. Therefore, when insects crawl from an item onto the wrapping material of the claimed invention, the insects become attached to the sticky element on the wrapping material, and therefore cannot infest the recipient's home, office, or hospital room. The sticky element prevents, or greatly reduces, the previously described undesirable disadvantages of receiving fresh flowers, floral arrangements, or potted plants.

The Embodiments of FIGS. 1–4

Referring to FIG. 1, designated generally by the reference numeral 10 is a wrapping material which is constructed in accordance with the present invention. The wrapping material 10 comprises at least one sheet of material 12. The sheet of material 12 has an upper surface 14, a lower surface 16, and an outer periphery 18 (an edge of which is lifted for illustration purposes only). As shown in FIG. 1, the outer periphery 18 of the sheet of material 12 comprises a first side 20, a second side 22, a third side 24, and fourth side 26. A sticky element 28 is disposed on at least one surface of the sheet of material 12, as will be described in further detail below.

The sheet of material 12 is utilized to wrap a flower pot 30a (FIG. 7). The term "flower pot" refers to any type of container used for holding a floral arrangement or a potted plant. The flower pot 30a comprises an outer surface 32a and an inner surface 34a.

Figure 14:
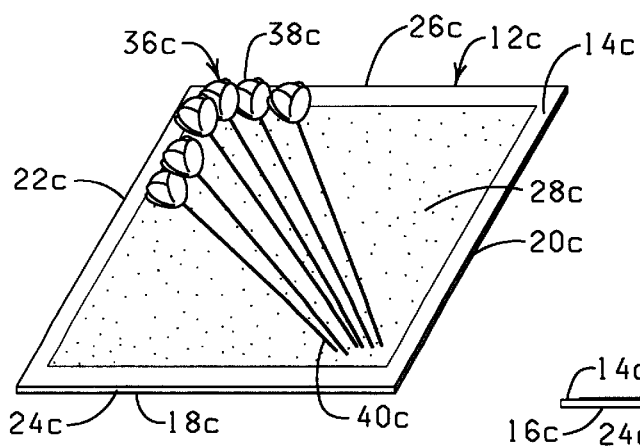
FIG. 14 is a perspective view of a sheet of material of the present invention, showing a floral arrangement disposed on the sheet of material.

The sheet of material 12 is also used to wrap about a floral arrangement 36c (FIG. 14). "Floral arrangement" as used herein means cut fresh flowers, artificial flowers, other fresh and/or artificial plants or other floral materials and may include other secondary plants and/or ornamentation which add to the aesthetics of the overall floral arrangement 36c. The floral arrangement 36c comprises a bloom or foliage portion, also referred to herein as a top portion, 38c and a stem portion, also referred herein as a bottom portion 40c. However, it will be appreciated that the bloom or foliage portion 38c of floral arrangement 36c may consist of only a single bloom or only foliage (not shown). In the embodiment of FIG. 1, the sheet of material 12 is square. It will be appreciated, however, that any shape or size of sheet of material 12 may be used to wrap a flower pot 30a or a floral arrangement 36c as long as it is sufficiently sized and shaped to wrap and encompass the flower pot 30a or floral arrangement 36c. For example, the sheet of material 12 may also comprise other shapes, i.e., rectangular, round, oval, octagonal, asymmetrical, or the like. And multiple sheets of material 12 may be used. Moreover, when multiple sheets of material 12 are used in combination, the sheets of material 12 need not be uniform in size or shape. Finally, it will be appreciated that the sheet of material 12 shown in all embodiments herein is substantially flat.

The sheet of material 12 may be constructed of a single sheet of material 12 or a plurality of sheets of material 12. Any thickness of the sheet of material 12 may be utilized in accordance with the present invention as long as the sheet of material 12 may be wrapped about at least a portion of a flower pot 30a or a floral arrangement 36c, as described herein. The sheet of material 12 has a thickness in a range of from about 1 mil to about 30 mils. Typically, the sheet of material 12 has a thickness in a range of from about 0.2 mil to about 30 mils. In a preferred embodiment, the sheet of material 12 is constructed from one sheet of man-made organic polymer film having a thickness in a range of from about 0.5 mil to about 2.5 mils.

The sheet of material 12 is constructed from any suitable material that is capable of being wrapped about a flower pot 30a or floral arrangement 36c. Preferably, the wrapping material 10 comprises paper (untreated or treated in any manner), cellophane, foil, man-made organic polymer film, fabric (woven or nonwoven or synthetic or natural), burlap, or combinations thereof.

The term "man-made organic polymer film" means a man-made resin such as a polypropylene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral arrangement.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one such man-made organic polymer film is a polypropylene film.

The sheet of material 12 may vary in color. Further, the sheet of material 12 may consist of designs which are printed, etched, and/or embossed thereon; in addition, the sheet of material 12 may have various colorings, coatings, flocking and/or metallic finishes, or be characterized totally or partially by pearlescent, translucent, transparent, iridescent or the like, qualities. Each of the above-named characteristics may occur alone or in combination. Moreover, each surface of the sheet of material 12 may vary in the combination of such characteristics.

The sheet of material 12 has a width 42 (FIG. 1) extending generally between the first side 20 and the second side 22, respectively, sufficiently sized whereby the sheet of material 12 can be wrapped about and encompass a floral arrangement 36c. The sheet of material 12 has a length 44 (FIG. 1) extending generally between the third side 24 and the fourth side 26, respectively, sufficiently sized whereby the sheet of material 12 extends over a substantial portion of the floral arrangement 36c when the sheet of material 12 has been wrapped about the floral arrangement 36c in accordance with the present invention, as described in detail below.

Figure 11:
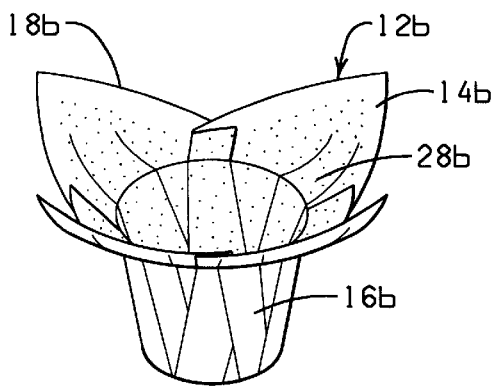
FIG. 11 is a perspective view of the sheet of material of the present invention, showing the sheet of material pre-formed into the shape of a flower pot cover, a sticky element disposed thereon.
Figure 12:
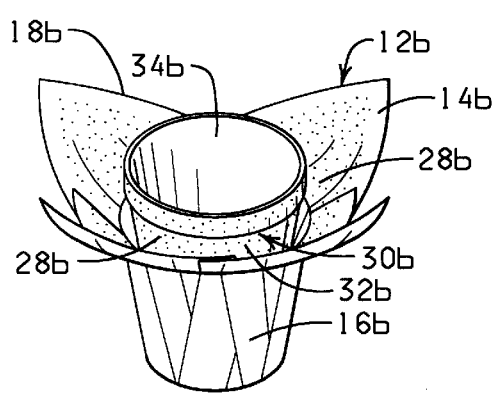
FIG. 12 is a perspective view of the method of the present invention, showing a flower pot being disposed on a pre-formed flower pot cover molded from the sheet of material.
Figure 13:
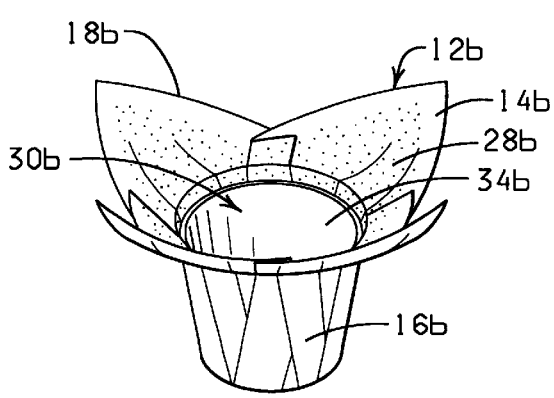
FIG. 13 is a perspective view of a flower pot covered by a pre-formed flower pot cover molded from the sheet of material.

The sheet of material 12 may be wrapped about the flower pot 30a to substantially wrap and cover the flower pot 30a in accordance with the present invention. The sheet of material 12 may also comprise a pre-formed flower pot cover, as illustrated in FIG. 11.

Referring now to FIG. 1, the sticky element 28 is disposed upon the sheet of material 12, preferably on the upper surface 14 of the sheet of material 12. The sticky element 28 substantially covers the upper surface 14 of the sheet of material 12. Alternatively, the sticky element 28 could be applied only to the lower surface 16 of the sheet of material 12, the sticky element 28 could be applied to both the upper surface 14 and the lower surface 16 of the sheet of material 12, or the sticky element 28 could be disposed upon only selected portions of the sheet of material 12, as described below. "Sticky element", as used herein, means any adhesive, or any adhesive/cohesive combination, having sticky qualities (i.e., qualities of adhesion or adhesion/cohesion, respectively) sufficient to cause the attachment an insect to the sticky element 28 when the insect contacts the sticky element 28. "Sticky qualities" means sufficient adhesion, or adhesion/cohesion, respectively (adhesion when an adhesive is used; adhesion/cohesion when any adhesive/cohesive combination is used), to cause the permanent attachment of an insect to the sheet of material 12 whenever an insect contacts, in any manner, the sticky element 28. Since the sticky element 28 may comprise either an adhesive or an adhesive/cohesive combination, it will be appreciated that both adhesives and cohesives are known in the art, and both are commercially available. For example, a preferred sticky element 28 (an adhesive) is available from Whitmire Research Laboratories, Inc., St. Louis, Mo.

The sticky element 28 may also comprise an antimicrobial agent. "Antimicrobial Agent," as used herein, means an agent possessing antifungal and/or antibacterial and/or known antimicrobial properties. A complete disclosure of such antimicrobial agents is contained within U.S. Ser. No. 07/538,293, filed Jun. 14, 1990, entitled Antimicrobial Materials and Methods which is hereby incorporated by reference into the present application.

The sticky element 28 comprises a liquid, a gas, a solid, a semi-solid, or any combination thereof. The sticky element 28 may be disposed upon a surface of the sheet of material 28 by spraying, painting, brushing, lacquering, immersing a surface of the sheet of material 12 in the sticky element 28, exposing a surface of the sheet of material 12 to sticky element-containing gas, rubbing the sticky element 28 thereupon, or any combination thereof. In a preferred embodiment, the sticky element 28 is contained within an aerosol or pump spray container, and the sticky element 28 is sprayed upon a surface of the sheet of material 12.

The sticky element 28 may be disposed upon a surface of the sheet of material 12 during the process of manufacturing the sheet of material 12, or immediately after the sheet of material 12 has been manufactured, by any method described herein. Alternatively, the sticky element 28 may be disposed upon the sheet of material 12 just prior to the use of the sheet of material 12 to wrap a floral arrangement 36c, or to decoratively cover a flower pot 30a.

The sticky element 28 is disposed on a surface 46, for example, doors (one such door shown in FIGS. 18–19), walls, ceilings, tables, trays, counter tops, floors, windows, lights, light fixtures, furniture, appliances, any other suitable surfaces, or any combination thereof. The surface 46 may also comprise a flower pot 30a, or a floral arrangement 36c. Further, the surface 46 may comprise a flower pot cover formed from a sheet of material 12, a wrapping material 10 comprising a sheet of material 12 used to wrap a floral arrangement 36c, or any combination thereof.

Preferably, the sticky element 28 comprises an insect attracting color. That is, the sticky element 28 comprises one or more colors, to attract insects. Ink, dye, pigment, or any combination thereof can be mixed with the sticky element 28, to create a colored sticky element 28. "Color" as defined herein means any color, combination of colors, mixture of colors, no color, or any combination thereof. Examples of such colors include blue, purple, green, yellow, red, orange, pink, colorless, white, black, gray brown, or any combination thereof. The above defined colors may be utilized alone, or in any combination.

The colored sticky element 28 may also comprise a "spot" or a tab attached to the sheet of material 12. Such a spot or tab designates an edge of the sheet of material 12, so that when a sheet of material 12 is removed from a surface or from being wrapped about an item (a floral arrangement 36c) an operator can easily identify the outer periphery 18 of the sheet of material 12 by the spot or tab, and thus lift the outer periphery 18 of the sheet of material 12 at the spot or tab, to remove the sheet of material 12 from a surface of an item.

The sticky element 28 further comprises, in a preferred embodiment, an insect attracting scent. "Insect attracting scents" as used herein means any scent or combination of scents that are known to attract insects. Examples of such scents include flowers, plants (such as fruits and vegetables), foods (for example, breads, cereals, candies), grasses, food condiments (such as honey, sugar, salt), herbs, spices, woods, roots, and the like. Such scents are known in the art, and are commercially available.

An insecticide may also be mixed with the sticky element 28. It will be appreciated that insecticides are also well-known in the art, and commercially available.

The sticky element 28 is disposed upon at least one surface of the sheet of material 12. Any thickness of the sticky element 28 may be disposed upon a surface of the sheet of material 12 in accordance with the present invention as long as the sticky element 28 functions as described herein. The sticky element 28, when disposed upon the sheet of material 12, has a thickness in a range from about 1 mil to about 30 mils. Typically, the sticky element 28 has a thickness in a range of from about 0.2 mil to about 30 mils. In a preferred embodiment, the sticky element 28 is disposed upon one surface of the sheet of material 12 comprising man-made organic polymer film, the adhesive having a thickness in a range of from about 0.5 mil to about 2.5 mils.

The sticky element 28 may comprise at least a portion of the decoration on the sheet of material 12. That is, any geometric, nongeometric, asymmetrical, or fanciful design ("design" as used herein means "decoration") on the sheet of material 12 may comprise, at least in part, a sticky element 28. The sticky element 28, when disposed upon the sheet of material 12, may comprise a non-geometric, asymmetrical or fanciful design, or a portion of a design, such as flowers, lace, hearts, ribbons, slogans, logos, and/or any series of letters and/or numbers, and the like (not shown), or any geometric form, for example, triangles, rectangles, octagonals, or the square, illustrated in FIG. 1 (the foregoing designs hereinafter collectively referred to as "spot" or "spots" of sticky element 28).

It will be appreciated, however, that the sticky element 28 may comprise one "spot" of sticky element 28, or a plurality of "spots" of sticky element 28, spread substantially over at least the upper surface 14 of the sheet of material 12, as long as the plurality of spots of sticky elements 28 create a continuous area of sticky element 28 near the entire outer periphery 18 of the sheet of material 12, in order to prevent any crawling insects from avoiding contact with the sticky element 28.

A release sheet 48 may also be applied to the sticky element 28 after it is disposed on a surface of the sheet of material 12, to protect the sticky qualities of the sticky element 28. One such release sheet 48 is shown in FIG. 4. The release sheet 48 has an upper surface 50, a lower surface 52, and an outer periphery 54.

The wrapping material 10 may comprise separate sheets of material 12 (not shown), or the wrapping material 10 may comprise a plurality of sheets of material 12 connected together to form a roll 56, as shown in FIGS. 2–4. Preferably, the plurality of sheets of material 12 in the roll 56 are detachable by perforations 21, as illustrated in FIG. 3. Such a roll 56 permits one sheet of material 12 to be withdrawn from the roll 56 (one sheet of material 12 shown partially detached, for illustration purposes only), the sheet of material 12 being severed from the roll 56. Alternatively, the roll 56 may simply be formed as a continuous roll 56 of wrapping material 10 without perforations, wherein a plurality of sheets of material 12 may be withdrawn from the roll 56 by unrolling a portion of the wrapping material 10 from the roll 56, and using a separate cutting element (not shown) to sever the unrolled portion of the wrapping material 10 from the roll 56 to form the sheet of material 12 (FIG. 4). The roll 56 may also be contained within a dispenser 58, as illustrated in FIG. 4. When the roll 56 is disposed in the dispenser 58, a portion of the wrapping material 10 is again unrolled, and a serrated cutting edge (not shown) contained within the dispenser 58, or a separate cutting element (not shown) severs the unrolled portion of the wrapping material 10 from the roll 56 to form a sheet of material 12. Any number of sheets of material 12 may form the roll 56 as long as it is possible to withdraw at least one sheet of material 12 from the roll 56 as described herein. A release sheet 48 may cover a surface of a single sheet of material 12, or all of the wrapping material 10 contained within the roll 56, as shown in FIG. 4. It will be appreciated that the release sheet 48 covers a surface of the sheet of material 12 having sticky elements 28 thereon to protect the sticky qualities of the sticky elements 28, and when a sheet of material 12 is severed from the roll 56, the release sheet 48 is simultaneously also severed from the roll 56. The release sheet 48 is releasably removed from the sheet of material 12 (shown for illustration purposes only) before the sheet of material 12 is disposed upon a flower pot 30a or wrapped about a floral arrangement 36c.

The Embodiment and Method of FIGS. 5–9

FIGS. 5–9 illustrate another embodiment and method of use of the present invention. The sheet of material 12a used in this method is constructed exactly the same as the sheet of material 12 shown in FIG. 1, except that the sticky element 28a is shown being disposed thereon in FIG. 5.

After the sheet of material 12a is withdrawn and detached from the roll 56 (not shown) by any means described herein, an operator disposes the sheet of material 12a on a relatively horizontal surface (not shown), the lower surface 16a of the sheet of material 12a contacting the horizontal surface. Next, the operator disposes the sticky element 28a upon the upper surface 14a of the sheet of material 12a, by any means described herein (for example, spraying the sticky element 28a thereon, as shown in FIG. 5), wherein the sticky element 28a substantially covers the upper surface 14a of the sheet of material 12a (FIG. 6). As shown in FIG. 7, a flower pot 30a is then provided, and the operator disposes the flower pot 30a on the upper surface 14a of the sheet of material 12a, and upon the sticky element 28a. As shown in FIGS. 8 and 9, the sheet of material 12a is then wrapped around the flower pot 30a by being formed and molded upward around the flower pot 30a by the operator, the upper surface 14a and the sticky element 28a thereon contacting the outer surface 32a of the flower pot 30a, whereby the sheet of material 12a formed about the flower pot 30a and the sheet of material 12a substantially surrounds and covers the flower pot 30a, wherein said sticky element 28a on a surface of the sheet of material 12a effectively causes a permanent attachment of an insect thereto when any portion of the insect contacts the sticky element 28a. It will be appreciated, however, that the sheet of material 12a may be pre-formed, by hand or by any means known in the art, before the sheet of material 12a is disposed about the flower pot 30a. Therefore, alternatively, the flower pot 30a may be inserted into a pre-formed flower pot cover constructed from the sheet of material 12a, the pre-formed flower pot cover substantially surrounding and covering the flower pot 30a, as previously described.

The Embodiment and Method of FIGS. 10–13

In an alternative embodiment shown in FIGS. 10–13, a flower pot 30b having a sticky element 28b disposed thereon is provided. The sticky element 28b is disposed, by any method described herein, on the outer surface 32b of a flower pot 30b. A sheet of material 12b as shown in FIG. 11 and, which is constructed exactly the same as the sheet of material 12 shown in FIG. 1, is also provided. The sticky element 28b is disposed by any method described herein on the upper surface 14b of the sheet of material 12b, which is preformed into a flower pot cover 60. The sticky element 28b can be covered by a release sheet (not shown), the release sheet being removed by the operator prior to the pre-formed flower pot cover 60 being disposed about the flower pot 30b. The operator disposes the pre-formed flower pot cover 60 on a relatively horizontal surface (not shown). The operator then takes the flower pot 30b and inserts the flower pot 30b into an opening 62 provided in the preformed flower pot cover 60 to receive the flower pot 30b, the upper surface 14b of the sheet of material 12b and the sticky element 28b thereon adjacent to and contactingly engaging the outer surface 32b of the flower pot 30b and the sticky element 28b thereon, the sheet of material 12b substantially surrounding and covering the outer surface 32b of the flower pot 30b, wherein the sticky elements 28b on the flower pot 30b and the flower pot cover 60, respectively, effectively cause a permanent attachment of an insect thereto when any portion of the insect contacts the sticky elements 12b.

In an alternative embodiment, the flower pot 30b has a sticky element 28b disposed thereon (FIG. 10), and the flower pot 30b is substantially wrapped by a sheet of material 12b (not shown) having no sticky element 28b thereon. The flower pot 30b is wrapped by any method described herein.

When the sheet of material 12b covers the flower pot 30b in the previously described methods, any insect crawling from the flower pot 30b contacts either the sticky element 28b disposed on the outer surface 32b of the flower pot 30b, or the sticky element 28b disposed on the upper surface 14b of the sheet of material 12b, and becomes permanently adhered thereto.

It will also be appreciated that a floral arrangement, such as the floral arrangement 36c may also have a sticky element 28 disposed thereon by any method described herein, and be wrapped by a sheet of material 12 having a sticky element 28 on a surface thereof, the sticky element 28 on, for instance, the upper surface 14 of the sheet of material 12 at least partially contacting the sticky element 28 on the floral arrangement 36c by any method described herein, the sheet of material 12 substantially wrapping and encompassing the floral arrangement 36c wherein any insect which contacts either the sticky element 28 on the floral arrangement 36c or the sticky element 28 on the sheet of material 12 becomes permanently adhered to either or both sticky elements 28. Similarly, it will be appreciated that a surface, for example, a floral arrangement 36c, or any other surface described herein, having a sticky element 28 thereon, may be wrapped and/or substantially covered by any method described herein by a sheet of material 12 which has no sticky element 28 thereon.

The Embodiment and Method of FIGS. 14–17

Figure 15:
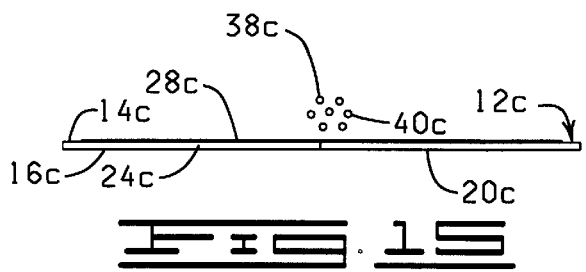
FIG. 15 is a side view of the floral arrangement disposed on the sheet of material of FIG. 14.
Figure 16:
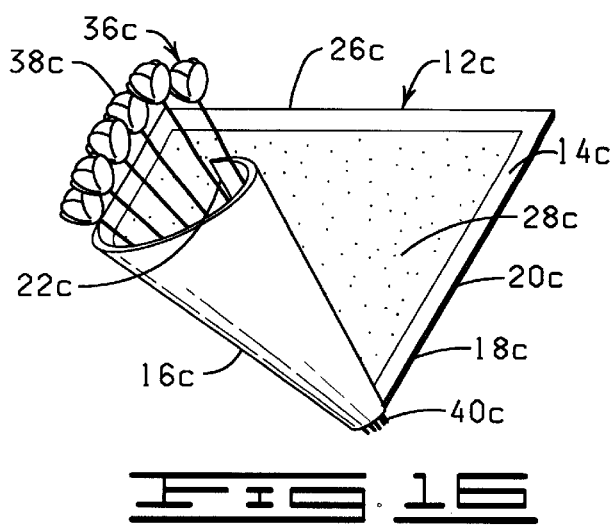
FIG. 16 is a perspective view of the floral arrangement being wrapped.
Figure 17:
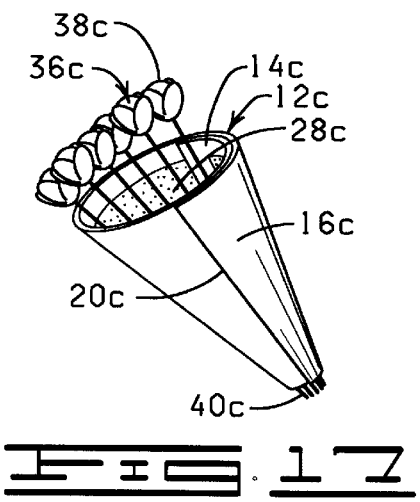
FIG. 17 is a perspective view of the floral arrangement wrapped.

FIGS. 14–17 illustrate another method of use of the present invention. The sheet of material 12c, which is constructed exactly the same as the sheet of material 12 shown in FIG. 1, is provided. An operator disposes the sheet of material 12c on a relatively horizontal surface (not shown), the lower surface 16c of the sheet of material 12c contacting the surface, and the upper surface 14c of the sheet of material 12c substantially covered by the sticky element 28c. Next, the operator disposes a floral arrangement 36c on the upper surface 14c of the sheet of material 12c and the sticky element 28c thereon, preferably near the center of the sheet of material 12c. As shown in FIG. 14, the portion of the floral arrangement 36c not touching the sheet of material 12c is the top portion 38c, and the portion of the floral arrangement touching the sheet of material 12c is the bottom portion 40c of the floral arrangement 36c. Referring to FIGS. 15–17, the sheet of material 12c is then wrapped about the floral arrangement 36c by the operator, the operator overlapping a portion of the sheet of material 12c over another portion of the sheet of material 12c. That is, for example, the operator places the second side 22c of the sheet of material 12c over the top portion 38c of the floral arrangement 36c, the bottom portion 40c of the floral arrangement 36c lying against and contacting the sheet of material 12c, then the operator places the first side 20c of the sheet of material 12c over the second side 22c of the sheet of material 12c, the first side overlapping portions of the sheet of material 12c by contacting the sticky element 28c thereon on the overlapping portion of the sheet of material 12c (near the second side 22c) with a corresponding adjacent portion of the sheet of material 12c (near the first side 20c), wherein both the top portion 38c and the bottom portion 40c of the floral arrangement 36c are substantially encompassed by the sheet of material 12c, and wherein the sticky element 28c on the sheet of material 12c contacts both itself and portions of the floral arrangement 36c to substantially encompass and surround a substantial portion of the floral arrangement 36c. It will be appreciated that the sticky qualities of the sticky element 28c will cause insects which contact the sticky element 28c to become permanently attached thereto.

Figure 18:
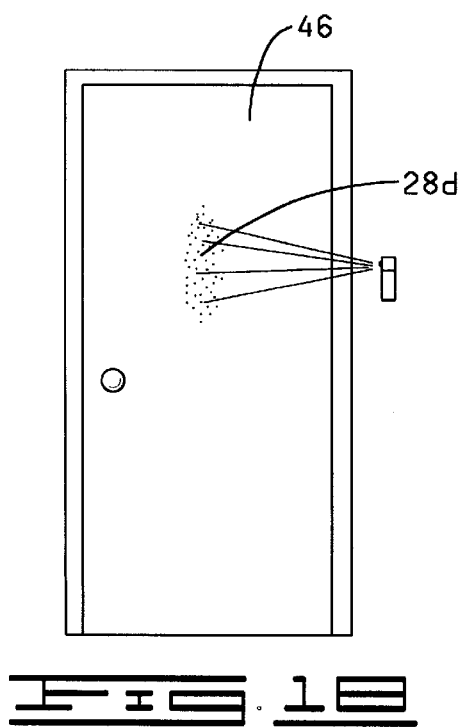
FIG. 18 is a front plan representation of a sticky element being disposed on a surface.
Figure 19:
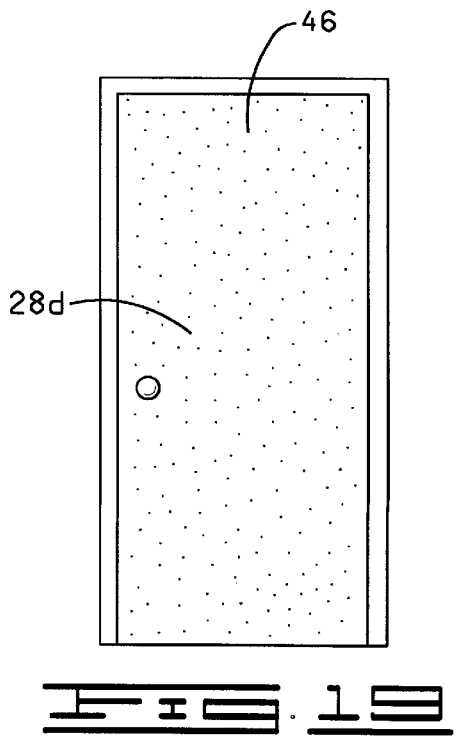
FIG. 19 is a front plan representation of a sticky element disposed on a surface.

The Embodiment and Method of FIGS. 18–19

In a final alternative method of use, as illustrated in FIGS. 18–19, the sticky element 28d may be disposed on any surface 46 defined herein, one such surface 46 (a door) shown in FIGS. 18–19. The sticky element 28d may be disposed (by any method described herein) on such surface 46, to substantially cover the surface 46 and to cause insects which contact the sticky element 28d to become permanently attached thereto.

Changes may be made in the embodiments of the invention described herein or in parts or elements of the embodiments described herein or in the steps or in the sequences of steps of the methods described herein without departing from the spirit and scope of the invention as defined in the following claims.

What is claimed is:

1. A method of disposing a flower pot cover on a flower pot, comprising:
   providing a flower pot cover formed from a sheet of material, the flower pot cover having a sticky element disposed upon at least a portion of a surface thereof, the sticky element having an insect-attracting scent, and sufficient sticky qualities to cause insects to become attached to the sticky element when the insects come into contact with the sticky element;
   providing a flower pot; and
   inserting the flower pot into the flower pot cover, such that the flower pot cover substantially covers the flower pot, and wherein the sticky element on a surface of the flower pot cover effectively causes attachment of insects thereto when the insects contact the sticky element.

2. The method of claim 1 wherein, in the step of providing the flower pot cover, the flower pot cover further includes an insect attracting color.

3. The method of claim 1 wherein, in the step of providing the flower pot cover, the flower pot cover further includes an insecticide.

4. The method of claim 2 wherein, in the step of providing the flower pot cover, the flower pot cover further includes an insecticide.

5. The method of claim 1 wherein, in the step of providing a flower pot cover, the sheet of material from which the flower pot cover is formed is selected from the group consisting of paper, foil, man-made organic polymer film, cellophane, fabric, burlap, and any combination thereof.

6. A method of forming a decorative cover about a flower pot, comprising the steps of:
   providing a sheet of material having an upper surface, a lower surface and an outer periphery;
   providing a sticky element having an element selected from the group consisting of a scent, an insecticide and any combination thereof;
   providing a flower pot having an outer surface;
   wrapping the sheet of material about the outer surface of the flower pot forming a decorative cover about the outer surface of the flower pot from the sheet of material; and
   disposing the sticky element on at least a portion of the decorative cover such that the sticky element thereon is exposed.

7. The method of claim 5 wherein, in the step of providing a sheet of material, the sheet of material is selected from the group consisting of paper, cellophane, foil, man-made organic polymer film, fabric, burlap, and any combination thereof.

8. The method of claim 6 wherein, in the step of providing a sheet of material, the sheet of material further comprises a scent.

9. The method of claim 6 wherein, in the step of providing a sheet of material, the sheet of material further comprises a color.

10. The method of claim 8 wherein, in the step of providing a sheet of material, the sheet of material further comprises an insecticide.

11. The method of claim 8 wherein, in the step of providing a sticky element, the sticky element further comprises an adhesive.

12. A method of disposing a sheet of material on a flower pot, comprising the steps of:
   providing a sheet of material having an upper surface, a lower surface and an outer periphery;
   providing a sticky element having an element selected from the group consisting of a scent, an insecticide and any combination thereof;
   providing a flower pot having an outer surface;
   wrapping the sheet of material about the outer surface of the flower pot, the sheet of material substantially surrounding and covering the outer surface of the flower pot, at least a portion of the sheet of material having a tab attached thereto;
   disposing the sticky element on at least a portion of the tab; and
   positioning the tab such that the sticky element thereon is exposed.

13. The method of claim 12 wherein, in the step of providing a sheet of material, the sheet of material is selected from the group consisting of paper, cellophane, foil, polymer film, fabric, burlap, and any combination thereof.

* * * * *